United States Patent
Shirakata et al.

(10) Patent No.: US 9,698,646 B2
(45) Date of Patent: Jul. 4, 2017

(54) ROTATING ELECTRICAL MACHINE (75) Inventors: Yuji Shirakata, Chiyoda-ku (JP); Dai Nakajima, Chiyoda-ku (JP); Masahiko Fujita, Chiyoda-ku (JP)

(73) Assignee: Mitusubishi Electric Corporation, Chiyoda-ku, Tokyo (JP)

( * ) Notice: Subject to any disclaimer, the term of this patent is extended or adjusted under 35 U.S.C. 154(b) by 714 days.

(21) Appl. No.: 14/131,482

(22) PCT Filed: Nov. 9, 2011

(86) PCT No.: PCT/JP2011/075803
§ 371 (c)(1),
(2), (4) Date: Jan. 8, 2014

(87) PCT Pub. No.: WO2013/069104
PCT Pub. Date: May 16, 2013

(65) Prior Publication Data
US 2014/0145526 A1    May 29, 2014

(51) Int. Cl.
*H02K 9/00*    (2006.01)
*H02K 5/10*    (2006.01)
*H02K 11/33*    (2016.01)

(52) U.S. Cl.
CPC .............. *H02K 5/10* (2013.01); *H02K 9/00* (2013.01); *H02K 11/33* (2016.01)

(58) Field of Classification Search
CPC ........ H02K 5/10; H02K 9/00; H02K 11/0073; H02K 11/33
See application file for complete search history.

(56) References Cited

U.S. PATENT DOCUMENTS

2004/0159924 A1    8/2004  Tokumitsu et al.
2004/0183385 A1*   9/2004  Takahashi ........... H01L 23/3672
                                                      310/68 D
(Continued)

FOREIGN PATENT DOCUMENTS

JP    58-035952 A    3/1983
JP    2004-253422 A   9/2004
(Continued)

OTHER PUBLICATIONS

Communication dated Oct. 15, 2015 from the European Patent Office in counterpart application No. 11875500.8.

*Primary Examiner* — Dang Le
(74) *Attorney, Agent, or Firm* — Sughrue Mion, PLLC; Richard C. Turner (57)    ABSTRACT A rotating electrical machine includes: a case; a rotor; a stator; a control portion including a field circuit portion used to supply a current to a control circuit and the field winding; a power circuit portion controlling a stator current; a heat sink installed so as to cool the control portion and the power circuit portion; a first waterproof portion providing waterproofing to signal terminals of the power circuit portion and the field circuit portion; a second waterproof portion provided with through-holes from which a part of the control portion and the power circuit portion is exposed and providing waterproofing between the control portion as well as the power circuit portion and the heat sink; and insulation portions installed in the through-holes of the second waterproof portion and isolating the control portion and the power circuit portion from the heat sink.

5 Claims, 9 Drawing Sheets (56) References Cited

U.S. PATENT DOCUMENTS

| | | |
|---|---|---|
| 2008/0211331 A1 | 9/2008 | Dubuc et al. |
| 2010/0308700 A1 | 12/2010 | Isoda et al. |
| 2011/0175496 A1 | 7/2011 | Shirakata et al. |

FOREIGN PATENT DOCUMENTS

| | | |
|---|---|---|
| JP | 2008-543266 A | 11/2008 |
| JP | 2011-147319 A | 7/2011 |

\* cited by examiner

ROTATING ELECTRICAL MACHINE

CROSS REFERENCE TO RELATED APPLICATIONS

This application is a National Stage of International Application No. PCT/JP2011/075803, filed Nov. 9, 2011, the contents of all of which are incorporated herein by reference in their entirety.

TECHNICAL FIELD

The present invention relates to a rotating electrical machine in which modules equipped with switching elements are attached to a heat sink with insulation in between, and to a controller-integrated rotating electrical machine formed by integrating an electric motor and a control portion including power circuits into one unit and mounted, particularly, on an automobile

BACKGROUND ART

Power circuit portions used in a rotating electrical machine are formed in modules phase by phase and the bottom surface of each module is bonded to a heat sink. PTL 1 discloses a configuration, according to which each bonding surface is flat and formed of a single metal plate. Herein, neither the bonding surface is isolated from the heat sink, nor waterproof treatment is applied between the back surface and the heat sink.

PTL 2 discloses a configuration, according to which the power circuit portions are formed of mold-encapsulated modules Herein, a plurality of modules are fixed to a disc-like heat sink with an insulating adhesive and all the modules on the heat sink are potted with encapsulation resin.

CITATION LIST

Patent Literature

PTL 1: JP-T-2008-543266 (the term "JP-T" as used herein means a published Japanese translation of a PCT patent application)
PTL 2: JP-A-2011-147319

SUMMARY OF INVENTION

Technical Problem

In the rotating electrical machine in the related art described above, when all the power circuit portions mounted on the heat sink are resin-encapsulated collectively to provide waterproofing between signal terminals and the heat sink and between the module back surfaces and the heat sink, because linear expansion coefficients vary among materials, such as encapsulation resin, switching elements, wires, and solder, a temperature change readily gives rise to heat stress in the respective portions. Hence, in order to enhance long-term reliability, a huge amount of effort, such as adjustment of the linear expansion coefficient of the encapsulation resin, is required. Because an amount of used resin is increased, a weight as a whole and also the cost are increased. In addition, workability becomes poor.

The invention was devised to solve the problems discussed above and has an object to provide a rotating electrical machine capable of obtaining a structure that makes it possible reduce encapsulation resin while securing a waterproof structure.

SOLUTION TO PROBLEM

A rotating electrical machine of the invention includes: a case formed of a front bracket and a rear bracket; a rotor installed inside the case and having a field winding; a stator installed inside the case and having a stator winding; a control portion including a field circuit portion used to supply a current to a control circuit and the field winding; a power circuit portion controlling a stator current flowed to the stator winding; a heat sink installed so as to cool the control portion and the power circuit portion; a first waterproof portion providing waterproofing to signal terminals of the power circuit portion and the field circuit portion; a second waterproof portion provided with through-holes from which a part of the control portion and the power circuit portion is exposed and providing waterproofing between the control portion as well as the power circuit portion and the heat sink; and insulation portions installed in the through-holes of the second waterproof portion and isolating the control portion and the power circuit portions from the heat sink.

ADVANTAGEOUS EFFECTS OF INVENTION

According to the rotating electrical machine of the invention, encapsulation resin can be omitted by providing the waterproof portions between the signal terminals and the heat sink and between the module back surfaces and the heat sink without resin-encapsulating the components as a whole. Hence, the weight of the power circuit portion can be reduced and time and effort required for resin encapsulation can be saved, which can in turn reduce the cost. In addition, by omitting resin encapsulation, it becomes possible to obtain a rotating electrical machine capable of reducing influences of heat stress applied to modules by a temperature cycle.

DESCRIPTION OF EMBODIMENTS

First Embodiment

Figure 1:
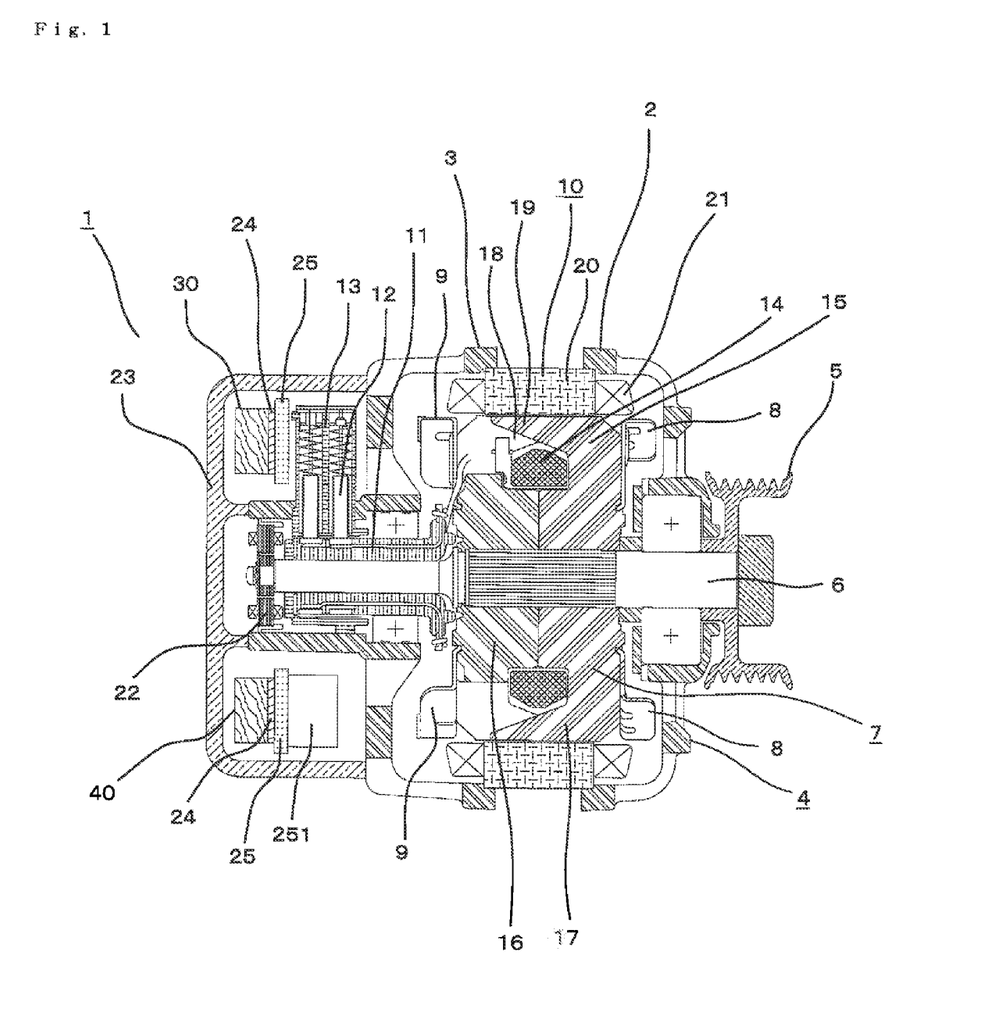
FIG. 1 is a cross section showing a rotating electrical machine according to a first embodiment of the invention.
Figure 2:
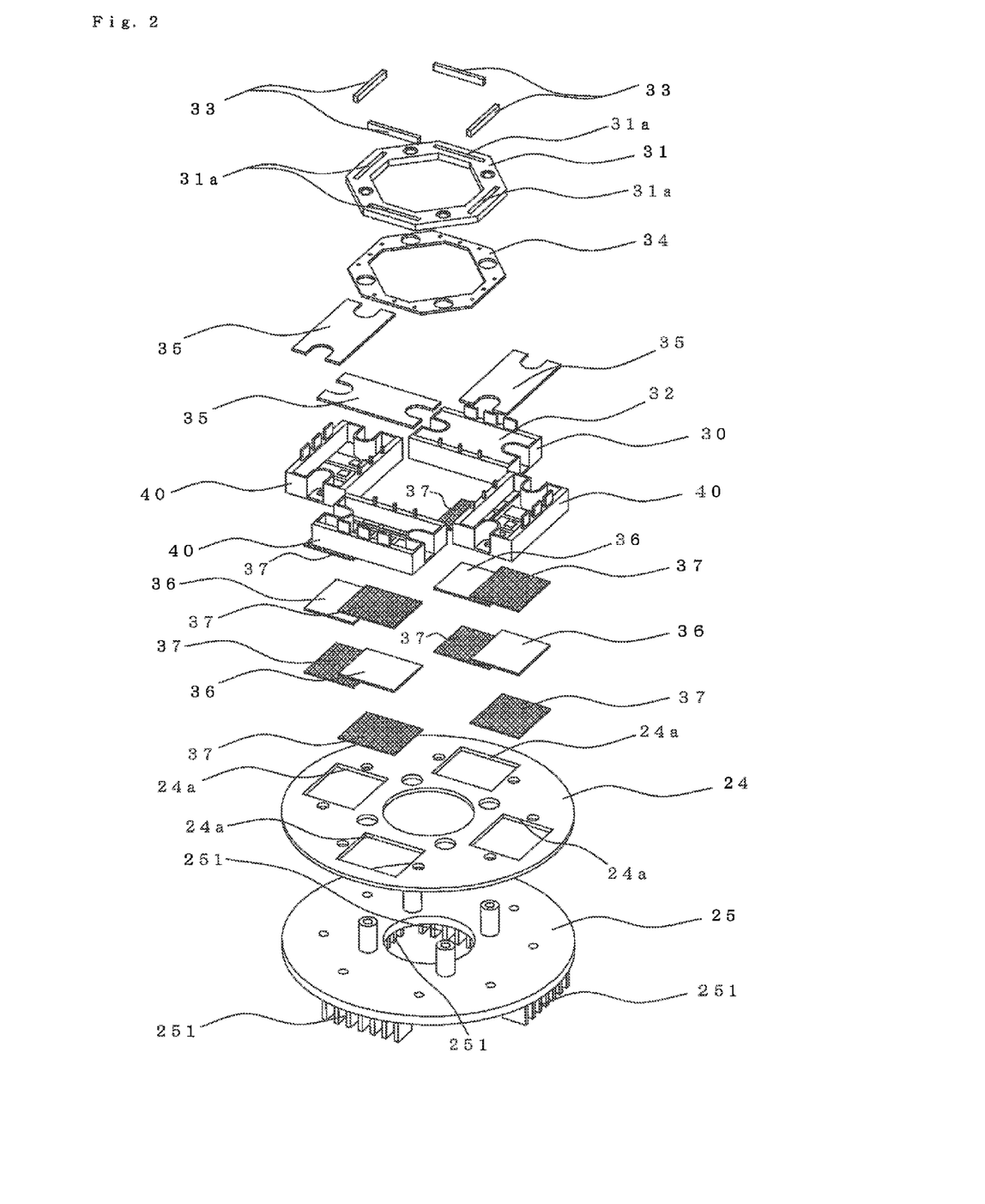
FIG. 2 is a developed perspective view showing a control portion and power circuit portions in the rotating electrical machine according to the first embodiment of the invention.
Figure 3:
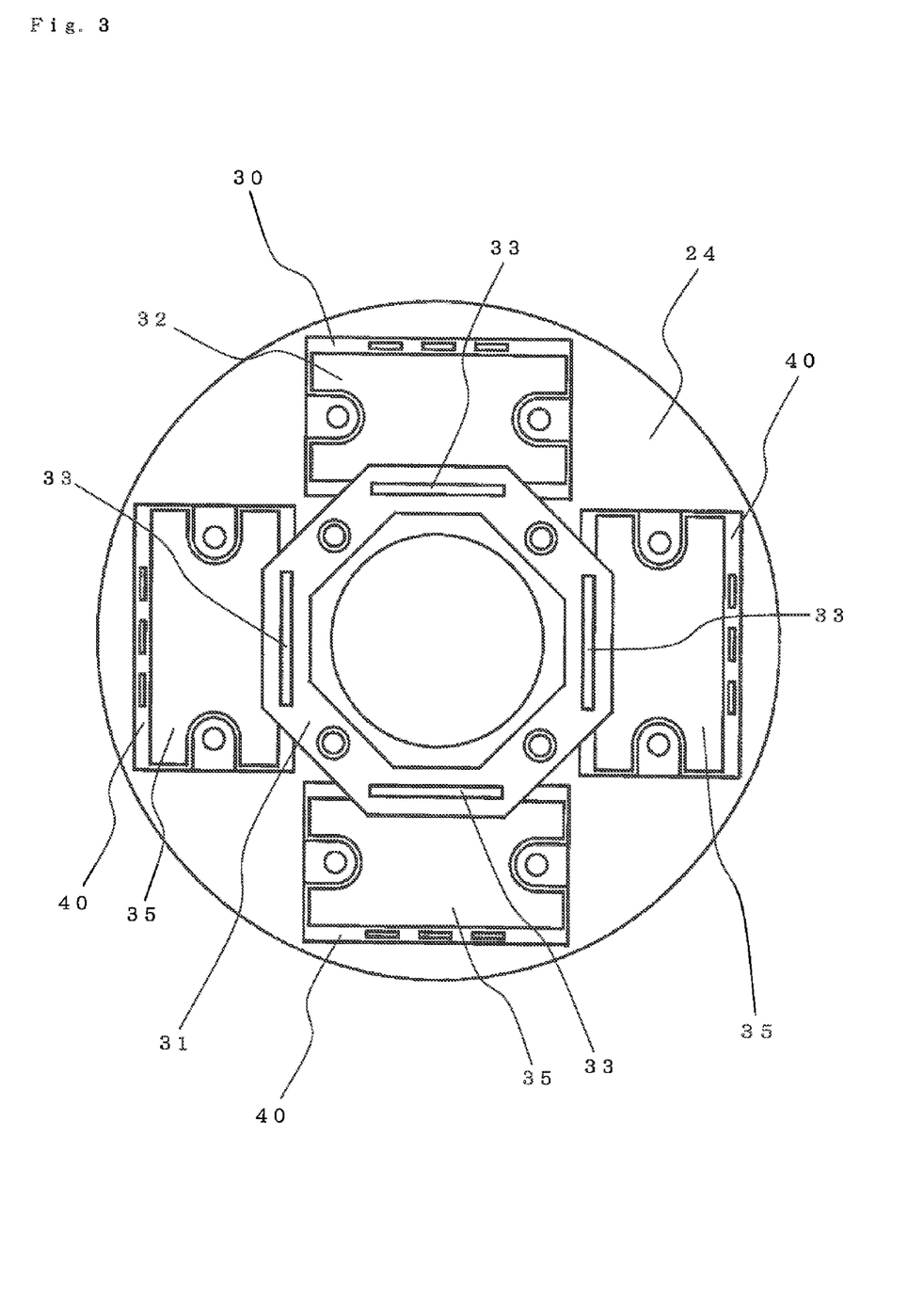
FIG. 3 is a plan view showing the control portion and the power circuit portions in the rotating electrical machine according to the first embodiment of the invention.
Figure 4:
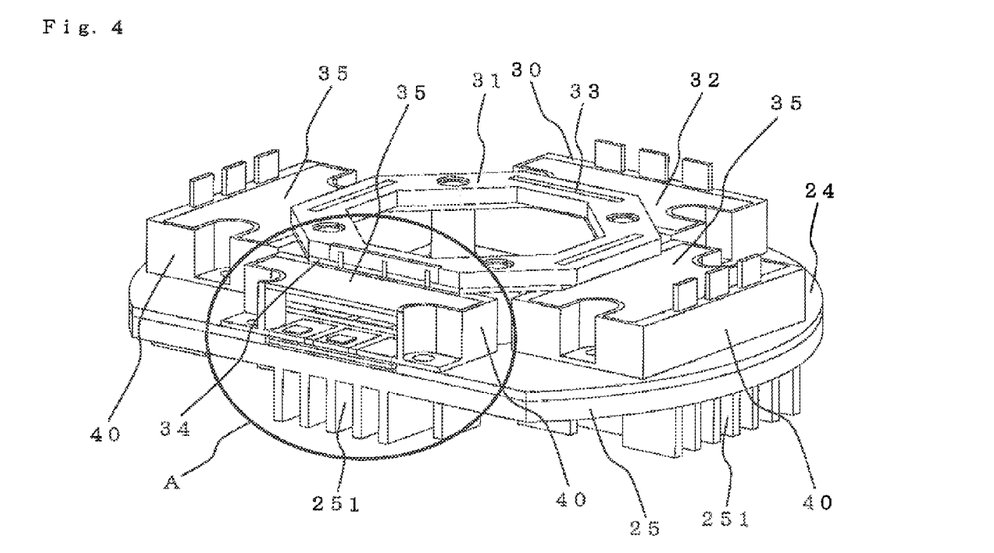
FIG. 4 is a perspective view showing the control portion and the power circuit portions in the rotating electrical machine according to the first embodiment of the invention.
Figure 5:
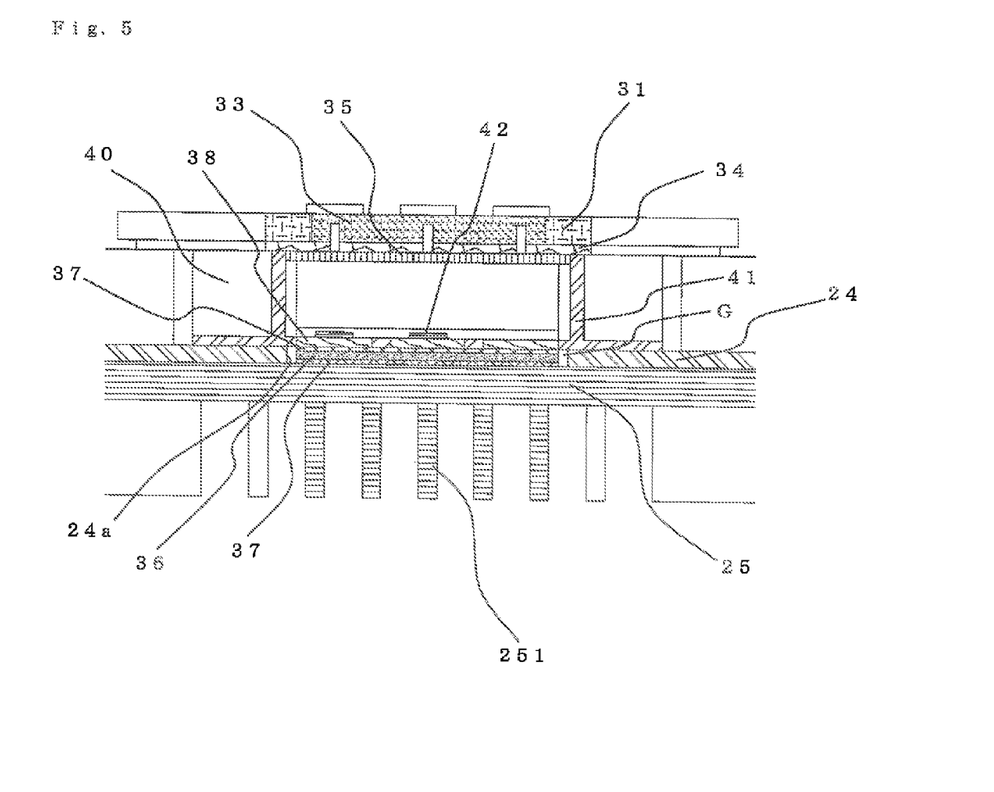
FIG. 5 is a cross section showing the power circuit portion in the rotary electrical machine according to the first embodiment of the invention.
Figure 6:
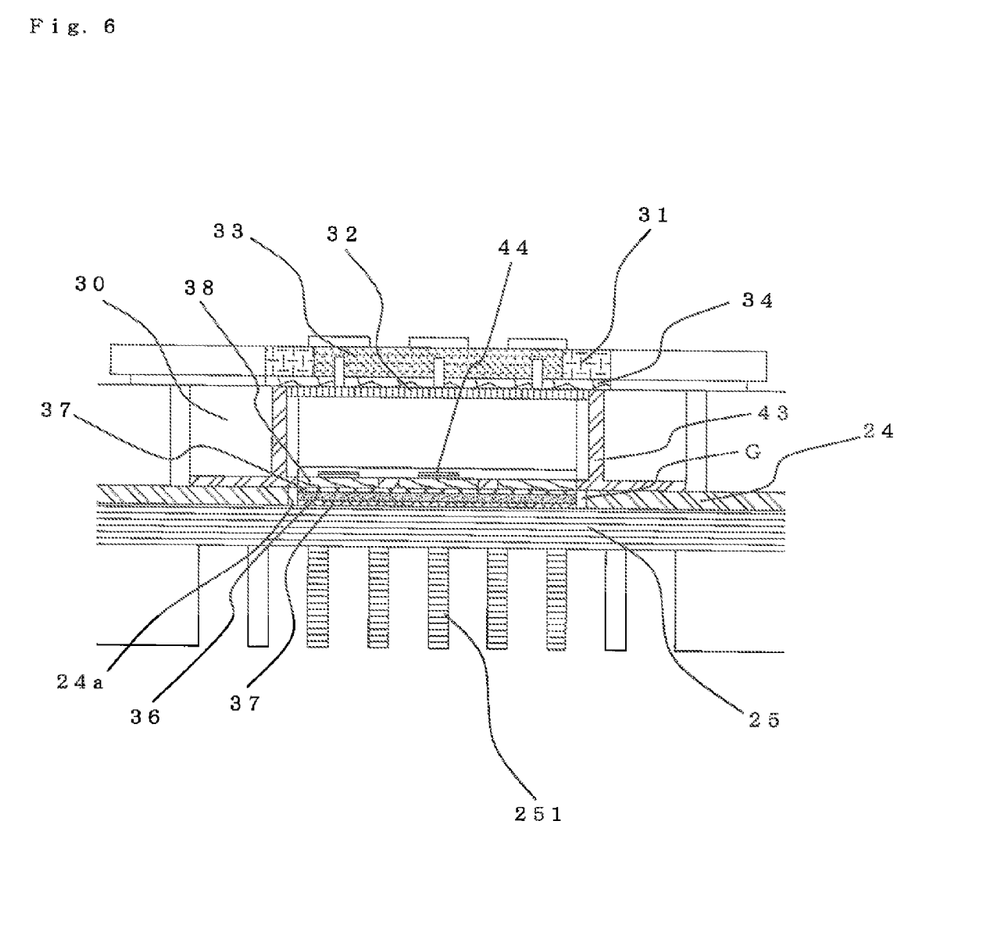
FIG. 6 is a cross section showing the control portion in the rotating electrical machine according to the first embodiment of the invention.

Hereinafter, a first embodiment of the invention will be described according to FIG. 1 through FIG. 5. Descriptions will be given by labeling same or equivalent members and portions with same reference numerals in the respective drawings. FIG. 1 is a cross section showing a rotating electrical machine according to the first embodiment of the invention. FIG. 2 is a developed perspective view showing a control portion and power circuit portions in the rotating electrical machine according to the first embodiment of the invention. FIG. 3 is a plan view showing the control portion and the power circuit portions in the rotating electrical machine according to the first embodiment of the invention. FIG. 4 is a perspective view showing the control portion and the power circuit portions in the rotating electrical machine according to the first embodiment of the invention. FIG. 5 is a cross section showing the power circuit portion in the rotating electrical machine according to the first embodiment of the invention, that is, a cross section of a portion A of FIG. 4. FIG. 6 is a cross section showing the control portion in the rotating electrical machine according to the first embodiment of the invention.

Referring to FIG. 1, a rotating electrical machine 1 of the first embodiment includes a case 4 formed of a front housing 2 and a rear housing 3 both made, for example, of aluminum, a shaft 6 installed inside the case 4 and to one end of which a pulley 5 is attached, a rotor 7 attached to the shaft 6, a front fan 8 formed, for example, of a centrifugal fan and attached to the rotor 7 on the side of front housing 2 to generate cooling air, a rear fan 9 formed, for example, of a centrifugal fan and attached to the rotor 7 on the side of the rear housing 3 to generate cooling air, a stator 10 fixed to the front housing 2 and the rear housing 3 on an inner wall surface in the case 4, slip rings 11 fixed to the other end of the shaft 6 to supply a field current to the rotor 7, a pair of brushes 12 sliding on the slip rings 11, and brush holders 13 fixed on the side of the rear housing 3 and storing the brushes 12 therein.

The pulley 5 exchanges outputs in two directions with an unillustrated internal combustion engine and is therefore connected to the internal combustion engine via a belt. Also, a field current is supplied to the rotor 7 via the brushes 12 from the brush holders 13 having the slip rings 11 and fixed on the side of the rear housing 3.

The rotor 7 includes a field winding 14 formed by winding a conducting wire and generating a flux when a current is flowed and a field core 15 provided so as to cover the field winding 14 and generating a magnetic pole using the flux.

The field core 15 is formed of a pair of a first pole core body 16 and a second pole core body 17 meshed with each other alternately. The first pole core body 16 and the second pole core body 17 are made of iron and have claw-like magnetic poles 18 and 19 of a claw shape, respectively. The adjacent claw-like magnetic poles 18 and 19 are installed so that a certain pole-to-pole clearance is formed in between for the purpose of preventing a flux from leaking between the claw-like magnetic poles and making the clearance serve as a passage for cooling air to cool the field winding 14.

The stator 10 includes a stator core 20 and a stator winding 21 formed by winding a conducting wire in slots (not shown) of the stator core 20 and generating AC with a variance of the flux of the field winding 14 in association with rotations of the rotor 7. The stator winding 21 is formed, for example, of a three-phase AC winding formed by connecting three winding portions (not shown) by three-phase Y connection or three-phase delta connection.

A resolver 22 is attached to the shaft 6 on the side of the brush holders 13. A cover 23 covering and thereby protecting a control portion 30, power circuit portions 40 and the like described below is attached to the rear side of the rotating electrical machine 1.

The rotating electrical machine 1 is provided with the control portion 30 that controls a field circuit portion and switching circuits, for example, in a side portion of the brush holders 13. A field current is adjusted according to an instruction from the control portion 30, which is mounted on the rotating electrical machine 1 in the form of one package.

The power circuit portion 40 collectively includes switching elements to supply a stator current during driving and rectify a stator current during power generation as one phase of switching elements and peripheral circuits. As are shown in FIG. 2 and FIG. 3, three phases of the power circuit portions 40 are installed at regular intervals.

A second waterproof portion 24, for example, in the form of a single disc provides waterproofing between the control portion 30 including a field circuit portion to supply a current to the control circuit and the field winding 14 as well as the power circuit portions 40 passing a stator current flowed to the stator winding 21 and a heat sink 25. The heat sink 25, for example, in the form of a single disc is installed on the back surface of the second waterproof portion 24 so as to cool the control portion 30 and the power circuit portions 40. The heat sink 25 is provided with a plurality of cooling fins 251 at each of positions corresponding to the control portion 30 and the power circuit portions 40.

Also, regarding control device components, such as the control portion 30 and the power circuit portions 40, as is shown in the developed perspective view of FIG. 2, the second waterproof portion 24 is mounted on the heat sink 25 and through-holes 24a are provided to the second waterproof portion 24 at positions corresponding to the control portion 30 and the power circuit portions 40. Insulation portions 36 provided with grease 37 on the both surfaces are stored in the respective through-holes 24a of the second waterproof portion 24. As is shown in FIG. 2, each of the power circuit portions 40 and the control portion 30 is formed of a single module.

The control portion 30 and the power circuit portions are placed along the peripheries of the respective through-holes 24a of the second waterproof portion 24. The control portion 30 and the power circuit portions 40 are closed by lids 32 and 35, respectively.

Further, a first waterproof portion 34 that provides waterproofing to signal terminals of the power circuit portions 40 and the field circuit portion and a wiring member 31 are mounted. The wiring member 31 is provided with storing holes 31a in which to store sealing materials A configuration of the module of the power circuit portion 40 will now be described. As is shown in FIG. 5, a resin case 41 having an insert-molded metal frame 38 is used. A power circuit semiconductor switching element (MOSFET or IGBT) 42 to supply a current to the stator winding 21 is bonded to the metal frame 38 in the resin case 41 using solder, resin, or the like.

A connection is established with power wiring terminals, signal terminals, and the like in the metal frame 38 by a connection portion made of metal having satisfactory conductivity (for example, gold, aluminum, and copper).

A waterproof structure is formed by bonding the lid 35 to the resin case 41 with liquid packing or the like. The interior of the resin case 41 may be potted with resin or the like in order to enhance resistance to vibration, waterproof performance, and reliability.

The periphery of the through-hole 24*a* of the second waterproof portion 24 provides waterproofing between the resin case 41 and the heat sink 25. The drawing shows a case where a clearance G is provided between the insulation portion 36 installed in the through-hole 24*a* of the second waterproof portion 24 and the second waterproof portion 24 by way of example.

The same applies to the control portion 30. As is shown in FIG. 6, a resin case 43 having an insert-molded metal frame 38 is used. A field semiconductor switching element 44 to supply a current to the field winding 14 and electronic components, such as a capacitor, are bonded to the metal frame 38 in the resin case 43. Further, the second waterproof portion 24 incorporating a control circuit is mounted thereon. A waterproof structure is formed by bonding the lid 32 to the resin case 43 with liquid packing or the like. Also, the interior of the resin case 43 maybe potted with encapsulation resin or the like.

The periphery of the through-hole 24*a* of the second waterproof portion 24 serves as the second waterproof portion 24 that provides waterproofing between the resin case 43 and the heat sink 25. The drawing shows a case where a clearance G is provided between the insulation portion 36 installed in the through-hole 24*a* of the second waterproof portion 24 and the second waterproof portion 24 by way of example.

In the power circuit portion 40, the metal frame 38 is exposed from the bottom surface of the resin case 41 in a portion corresponding to the through-hole 24*a* in order to enhance heat-releasing performance, and the respective metal frames 38 have potentials, such as P, N, and AC. Likewise, in the control portion 30, the metal frame 38 having potential is exposed from the bottom surface of the resin case 43.

In the embodiment described above, the resin cases 41 and 43 are used for the power circuit portions 40 and the control portion 30, respectively. It should be appreciated, however, that mold resin-encapsulated modules are also available.

Also, metal with satisfactory heat conductivity and electrical conductivity, for example, copper or copper alloy with good heat conductivity, is used for the metal frame 38

Signal terminals of the power circuit portions 40 and the control portion 30 are bonded to the wiring member 31 by soldering, a laser, welding or pressure welding.

The power circuit portions 40 and the control portion 30 are mounted on the disc-like heat sink 25. As are shown in FIG. 5 and FIG. 6, the metal frames 38 are exposed from the bottom surfaces of the resin cases 41 and 43 in portions corresponding to the through-holes 24*a*. It is therefore necessary to isolate these resin cases 41 and 43 from the heat sink 25.

To this end, a plurality of the power circuit portions 40 and the control portion 30 are installed on the heat sink 25 via the insulation portions 36 formed by coating the both surfaces of insulators, such as an insulating sheet and ceramic, with the grease 37. Because the insulation portions 36 are also used to release heat, it is necessary to use an insulating material with high heat conductivity and reduce a thickness of the grease 37 applied between the insulation portions 36 and the heat sink 25 and between the modules and the heat sink 25.

Regarding a dielectric strength, an insulator can be thin for a low strength system because a creeping distance to secure a predetermined dielectric strength is short. By tightening fixing screws of the resin cases 41 and 43, the applied grease 37 can be thinner and therefore heat resistance can be reduced.

It is also possible to use a heat-releasing adhesive or the like instead of the grease 37.

The structure herein is as follows. That is, the insulation portions 36 and the second waterproof portion 24 are installed on a same plane of the heat sink 25 and the second waterproof portion 24 is present along the outer peripheries of the insulation portions 36 via the clearances G. The resin cases 41 and 43 of the power circuit portions 40 and the control portion 30, respectively, are fixed to the heat sink 25 with screws or the like via the second waterproof portion 24 so that the second waterproof portion 24 is pressed.

The rotating electrical machine can be manufactured by hardly providing a clearance between the second waterproof portion 24 and the insulation portions 36. However, by providing the clearances G, a rejection space for the grease 37 can be secured. It thus becomes possible to gain a creeping distance by a quantity comparable to the grease 37 that has overflown.

The heat sink 25 is of a disc shape and provided with the cooling fins 251 for cooling on the back surface side of the power circuit portions 40 and the control portion 30 mounted on the same plane. By forming the heat sink 25 into a disc shape, an installation space within the cover 23 of the rear bracket 3 can be used effectively and the heat sink 25 can be increased to the maximum size. It thus becomes possible to secure an installation space for the power circuit portions 40 and the control portion 30 and to secure the fin areas.

Because basic components of the rotating electrical machine 1 undergo rotary motion, a volume thereof can be minimized by forming the rotating electrical machine 1 in a cylindrical shape. In quest to increase the vehicle chamber to the largest possible extent, the engine room of an automobile is made compact. Also, from the safety viewpoint, there is a demand to make the engine and the rotating electrical machine installed inside the engine room more compact.

Accordingly, it is crucial in overcoming the restrictions described above to form the power circuit portions 40 in a circular shape and to install the power circuit portions 40 intensively at the top of the cylinder as the controller-integrated rotary electrical machine 1. In other words, it is particularly necessary to install the power circuit portions 40 efficiently in a limited space on a circular plate in achieving a more compact product.

Owing to the layout arrangement as above, it becomes possible to provide waterproofing without collectively resin-encapsulating the power circuit portions 40 and the control portion 30 of the rotating electrical machine 1 and a region to be potted can be reduced. It thus becomes possible to realize a structure that not only makes it possible to reduce heat stress to the semiconductor switching elements and bonding portions thereof as well as the weight, but also makes it possible to reduce the cost.

The bottom surface of the metal frame 38 is exposed entirely or partially from the resin case 41 in the module bottom surface of the power circuit portion 40.

It is therefore necessary to isolate the module bottom surfaces of the power circuit portions 40 from the heat sink 25. For example, in the case of an automobile, about 20 µm is sufficient because a voltage exceeding 100 V is not applied. However, it is necessary to secure insulation also in a case where conductive foreign matter comes inside. Hence, by forming the insulation portions 36 using an insulating material, such as an insulation sheet and ceramic, a least necessary withstand voltage can be secured.

Also, heat resistance is decreased by applying the grease 37 to the top and bottom of the insulation portions 36. Because the modules of the power circuit portions 40 are fixed to the heat sink 25 with screws or the like, the grease 37 is ejected by the fixation. Also, because the second waterproof portion 24 is present along the outer peripheries of the insulation portions 36, a waterproof measure can be provided by fixing the modules together with the second waterproof portion 24.

Regarding the signal terminals of the modules of the power circuit portions 40, the first waterproof portion 34 is attached to the vicinity of the terminals, on top of which the wiring member 31 is fixed to the heat sink 25 with screws the like and a pressure is applied at the same time. A waterproof measure around the signal terminal can be provided by potting the interior of the wiring member 31 with encapsulation resin after the signal terminals and the wiring member 31 are bonded.

Also, by interposing the grease 37 between the modules of the power circuit portions 40 and the heat sink 25, it becomes possible to ease heat stress from the heat sink 25 to the modules of the power circuit portions 40.

In FIG. 2, the mounting surface of the heat sink 25 for the modules of the power circuit portions 40 is a flat surface. It should be appreciated, however, that the heat sink 25 can be used without polishing the surface when roughness or flatness falls within a range that can be absorbed by the second waterproof portion 24 and the grease 37 of the insulation portions 36.

In FIG. 2, both of the module bottom surfaces of the power circuit portions 40 and the mounting surface of the heat sink 25 are flat. Cases where neither of these surfaces is flat will be described below.

The bottom surface of the metal frame 38 is exposed entirely or partially from the resin case 43 in the module bottom surface of the control portion 30. Hence, as with the power circuit portions 40, it is necessary to isolate the module bottom surface of the control portion 30 from the heat sink 25. By configuring the control portion 30 in the same manner as in the power circuit portions 40 described above, the same advantages can be obtained.

In this manner, by using the first waterproof portion the second waterproof portion 24, and the insulation portions 36 as insulation and waterproof measures for the modules of the power circuit portions 40 and the control portion 30, it is no longer necessary to resin-encapsulate the modules of the power circuit portions 40 and the control portion 30 as a whole and the measures can be taken module by module. It thus becomes possible to reduce heat stress from the encapsulation resin.

Also, an amount of used resin is reduced, which can in turn reduce the weight and the cost. Further, by omitting resin encapsulation, influences of heat stress applied to the modules of the power circuit portions 40 and the control portion 30 by a temperature cycle can be reduced.

Because the modules of the power circuit portions 40 and the control portions 30 are bonded to the heat sink 25 without using an adhesive or the like, influences of heat stress applied to the heat sink 25 during the temperature cycle can be eased. In addition, the presence of the insulator secures insulation even when foreign matter comes inside.

Second Embodiment

Figure 7:
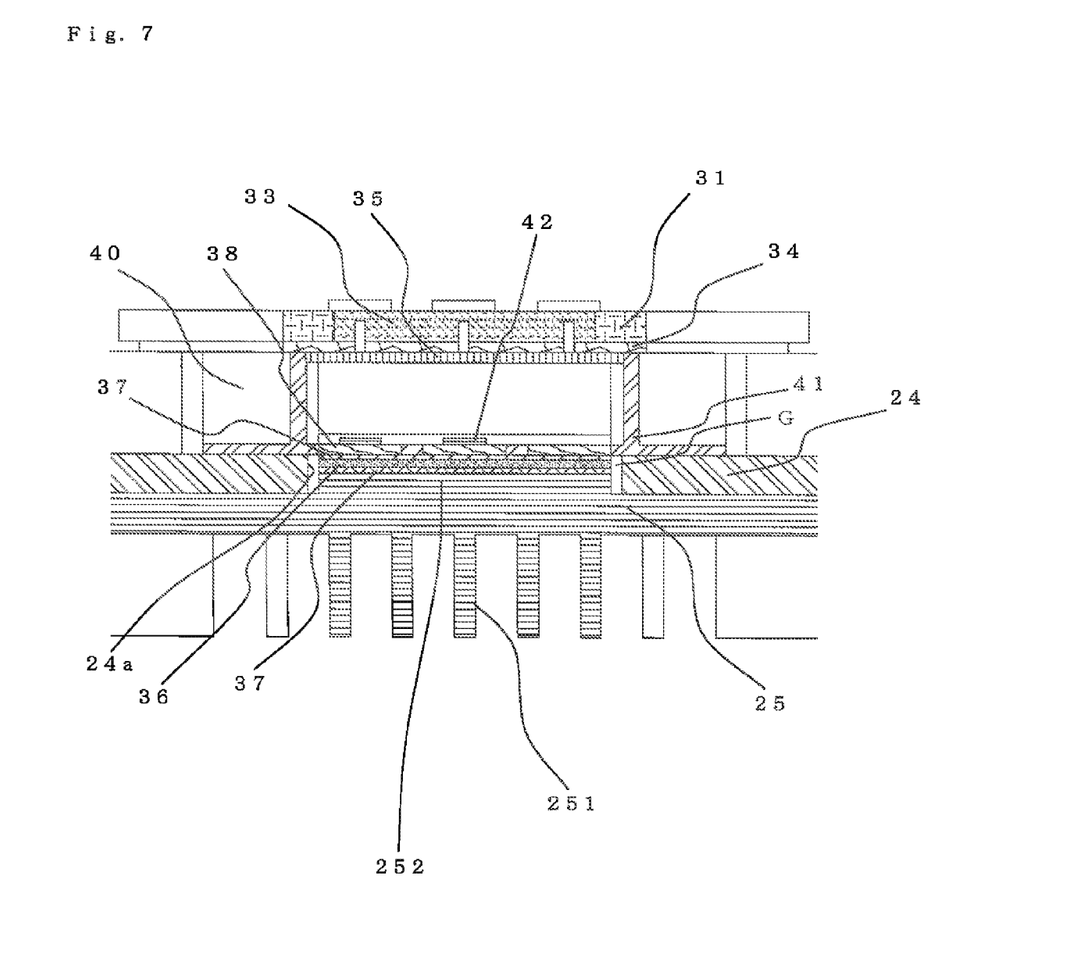
FIG. 7 is a cross section showing a power circuit portion in a rotating electrical machine according to a second embodiment of the invention.

A second embodiment of the invention will be described according to FIG. 7. FIG. 7 is a cross section showing a power circuit portion in a rotating electrical machine according to the second embodiment of the invention.

As is shown in FIG. 7, the heat sink 25 can be of a s configuration provided with convex portions 252 on the bottom surface side of the resin cases 41 and 43 of the power circuit portions 40 and the control portion 30, respectively.

The convex portions 252 provided to the heat sink 25 increase a volume of the clearances G between the insulation portions 36 and the second waterproof portion 24 and a larger space can be secured for ejection of the grease 37. It thus becomes possible to further gain a creeping distance from the heat sink 25.

Figure 8:
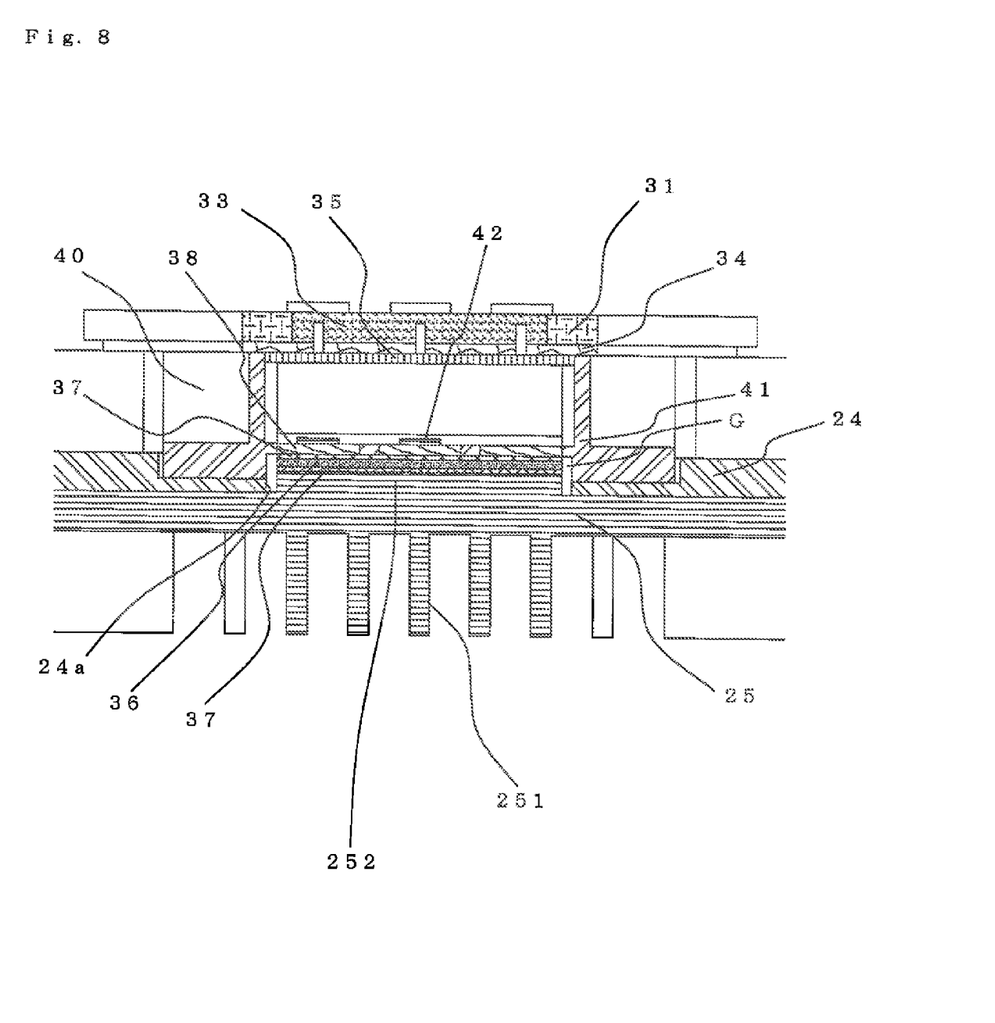
FIG. 8 is a cross section showing a power circuit portion in a rotating electrical machine according to a third embodiment of the invention.

In this manner, by using the first waterproof portion 34, the second waterproof portion 24, and the insulation portions 36 as insulation and waterproof measures for the modules of the power circuit portions 40 and the control portion 30, it is no longer necessary to resin-encapsulate the modules of the power circuit portions 40 and the control portion 30 as a whole and the measures can be taken module by module. It thus becomes possible to reduce heat stress from the encapsulation resin. Also, an amount of used resin is reduced, which can in turn reduce the weight and the cost Third Embodiment A third embodiment of the invention will be described according to FIG. 8. FIG. 8 is a cross section showing a power circuit portion in a rotating electrical machine according to the third embodiment of the invention.

As is shown in FIG. 8, the heat sink 25 is provided with the convex portions 252 and the bottom surface side of the resin cases 41 and 43 of the power circuit portions 40 and the control portion 30, respectively, are formed in a concave shape. In this case, an insulation distance can be increased. Accordingly, because a structure from the resin cases 41 and 43 of the power circuit portions 40 and the control portion 30, respectively, to the heat sink 25 can be close to a labyrinth structure, by which a waterproof measure can be provided.

In this manner, by using the first waterproof portion 34, the second waterproof portion 24, and the insulation portions 36 as insulation and waterproof measures for the modules of the power circuit portions 40 and the control portion 30, it is no longer necessary to resin-encapsulate the modules of the power circuit portions 40 and the control portion 30 as a whole and the measures can be taken module by module. It thus becomes possible to reduce heat stress from the encapsulation resin. Also, an amount of used resin is reduced, which can in turn reduce the weight and the cost.

Fourth Embodiment

Figure 9:
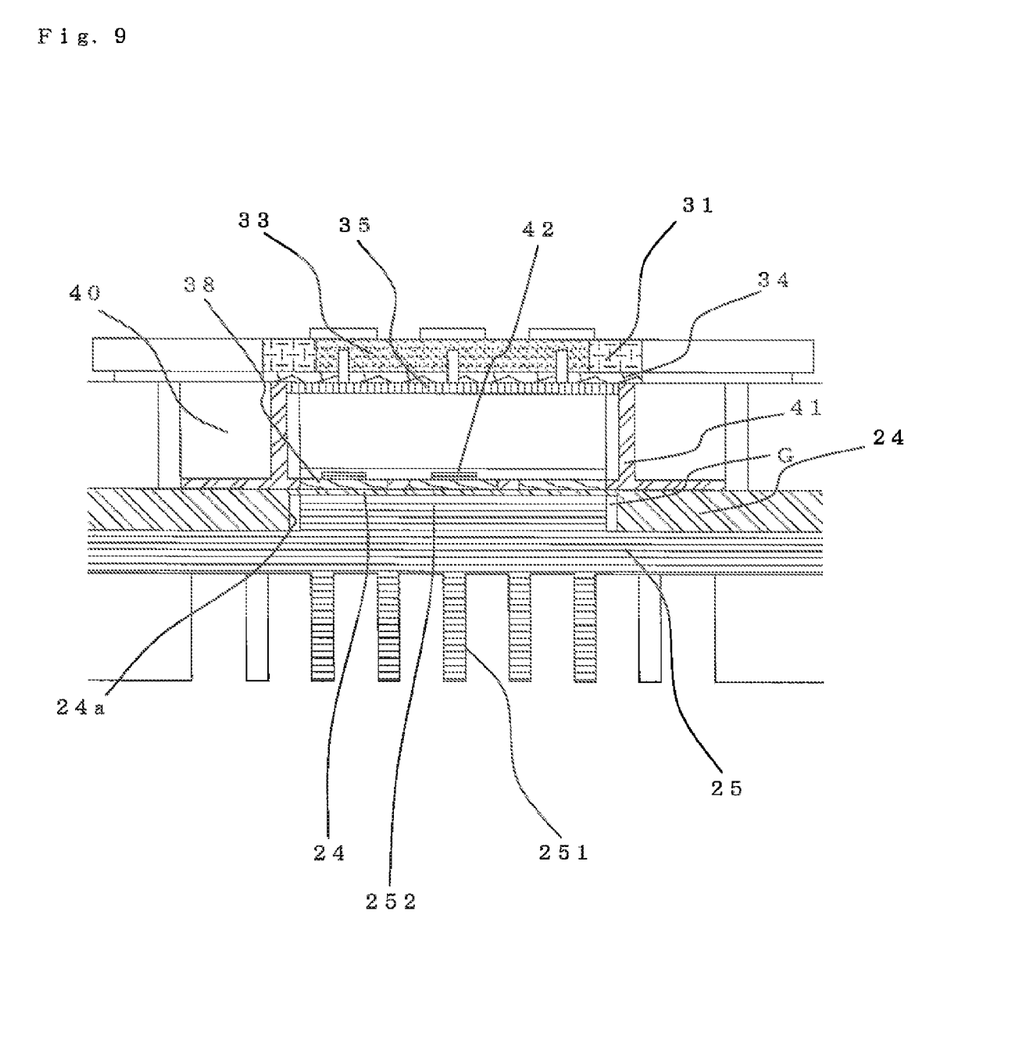
FIG. 9 is a cross section showing a power circuit portion in a rotating electrical machine according to a fourth embodiment of the invention.

A fourth embodiment of the invention will be described according to FIG. 9. FIG. 9 is a cross section showing a power circuit portion in a rotating electrical machine according to the fourth embodiment of the invention.

In the first embodiment above, the insulation portions 36 are used to isolate the module bottom surfaces of the power circuit portions 40 and the control portion 30 from the heat sink 25. However, as is shown in FIG. 9, insulation can be provided by integrating the second waterproof portion 24 and the insulation portions 36 into one unit.

Because the second waterproof portion 24 serves also as the insulation portions 36, the same member can be used, which can in turn reduce the number of components and man-hours during the fabrication.

By providing the convex portions 252 to the heat sink 25 at positions at which the power circuit portions 40 and the control portion 30 are installed, the second waterproof portion 24 can be thinner, which can in turn reduce heat resistance.

A material with satisfactory heat conductivity is used for The second waterproof portion 24.

According to the fourth embodiment, because the second waterproof portion 24 serves also as the insulation portions 36, the number of components can be reduced and man-hours can be reduced due to enhancement of ease of attachment during the fabrication while maintaining the waterproof performance.

Fifth Embodiment

Figure 10:
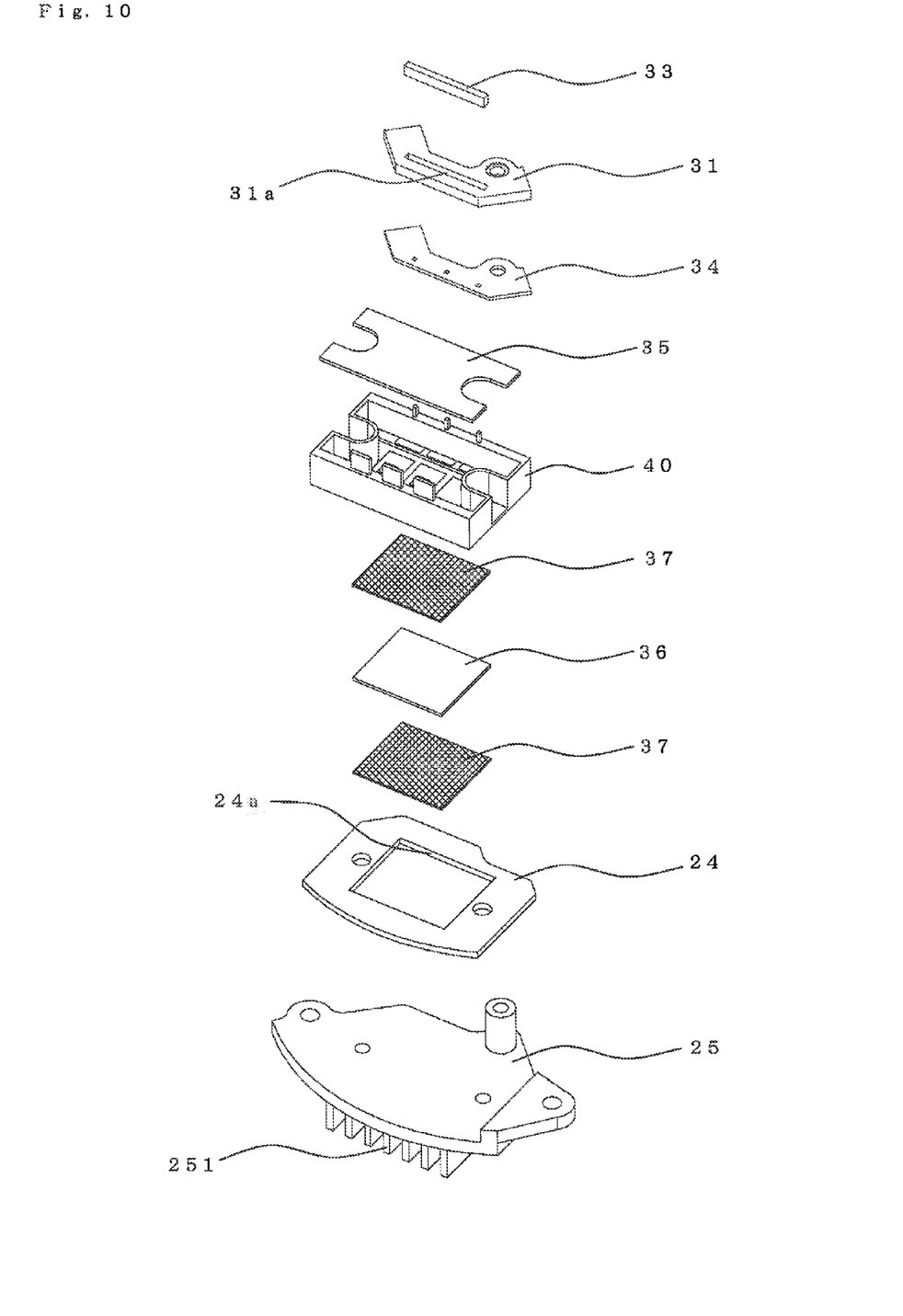
FIG. 10 is a developed perspective view showing one phase of a power circuit portion in a rotating electrical machine according to a fifth embodiment of the invention.

A fifth embodiment of the invention will be described according to FIG. 10. FIG. 10 is a developed perspective view showing one phase of a power circuit portion in a rotating electrical machine according to the fifth embodiment of the invention.

In the first embodiment above, the heat sink 25 is a single disc-like body. It should be appreciated, however, that the heat sink 25 may be divided for each of the power circuit portions 40 and the control portion 30.

As is shown in FIG. 10, by dividing the heat sink 25, a size of individual modules including the heat sink 25 becomes smaller and a shape variation caused by a temperature change can be lessened. It thus becomes possible to reduce heat stress applied to the power circuit portions 40 and the control portion 30.

Because the size of the heat sink 25 becomes smaller than that of the heat sink 25 of a disc shape, the cost can be reduced due to enhancement of flatness and enhancement of productivity.

According to the fifth embodiment, by dividing the heat sink 25, it becomes possible to reduce the cost because an amount of variation caused by heat stress is reduced and productivity is enhanced.

It should be understood that the respective embodiments of the invention can be combined without any restriction and the respective embodiments can be modified or omitted as the need arises within the scope of the invention.

INDUSTRIAL APPLICABILITY

The invention is suitable to realize a rotating electrical machine capable of obtaining a structure which makes it possible to reduce encapsulation resin while securing a waterproof structure.

The invention claimed is:

1. A rotating electrical machine, characterized by comprising:
    a case formed of a front bracket and a rear bracket;
    a rotor installed inside the case and having a field winding;
    a stator installed inside the case and having a stator winding;
    a control portion including a field circuit portion used to supply a current to a control circuit and the field winding;
    a power circuit portion controlling a stator current flowed to the stator winding;
    a heat sink installed so as to cool the control portion and the power circuit portion;
    a first waterproof portion providing waterproofing to signal terminals of the power circuit portion and the field circuit portion;
    a second waterproof portion provided with through-holes from which a part of the control portion and a part of the power circuit portion is exposed, and providing waterproofing between the control portion as well as the power circuit portion and the heat sink; and
    insulation portions installed in the through-holes of the second waterproof portion and isolating the control portion and the power circuit portion from the heat sink,
    wherein both the control portion and the power circuit portion are located between the first waterproof portion and the second waterproof portion in an axial direction of the rotor.

2. The rotating electrical machine according to claim 1, characterized in that:
    the insulation portions are formed of an insulator having low heat resistance and grease.

3. The rotating electrical machine according to claim 1, characterized in that:
    a clearance is provided between the insulation portions and the second waterproof portion.

4. The rotating electrical machine according to claim 1, characterized in that:
    the insulation portions and the second waterproof portion are integrated into one unit.

5. The rotating electrical machine according to claim 1, characterized in that:
    the heat sink is divided for each of the control portion and the power circuit portion.

* * * * *